United States Patent [19]

Best

[11] 4,167,761
[45] Sep. 11, 1979

[54] PRECEDENT AND SUBSEQUENT MINOR TRANSITIONS TO ALLEVIATE PULSE CROWDING

[75] Inventor: Donald T. Best, Lafayette Hills, Pa.

[73] Assignee: Sperry Rand Corporation, New York, N.Y.

[21] Appl. No.: 893,103

[22] Filed: Apr. 3, 1978

[51] Int. Cl.$^2$ .............................................. G11B 5/09
[52] U.S. Cl. ...................................................... 360/45
[58] Field of Search ............................................ 360/45

[56] References Cited

U.S. PATENT DOCUMENTS

| | | | |
|---|---|---|---|
| 3,503,059 | 3/1970 | Ambrico | 360/45 |
| 3,665,485 | 5/1972 | Pear, Jr. | 360/45 |
| 3,869,714 | 3/1975 | Schneider et al. | 360/45 |

*Primary Examiner*—Vincent P. Canney
*Attorney, Agent, or Firm*—Thomas J. Scott; William E. Cleaver; Marshall M. Truex

[57] ABSTRACT

In a magnetic recording system having a medium for storing information in the form of encoded digital data, an improvement in the recording head control circuit including means and a method for determining the temporal occurrence of a major write transition of the encoded digital data and producing a minor write pre-transition and a minor write post-transition each having a lower amplitude and an opposite direction to that of the major write transition thereby providing a readout pulse corresponding to the combined write transitions having a narrower pulse width and improved symmetry which enhances the accuracy in reading out the recorded digital data and increases the packing density in the storage medium of the recording system.

15 Claims, 10 Drawing Figures

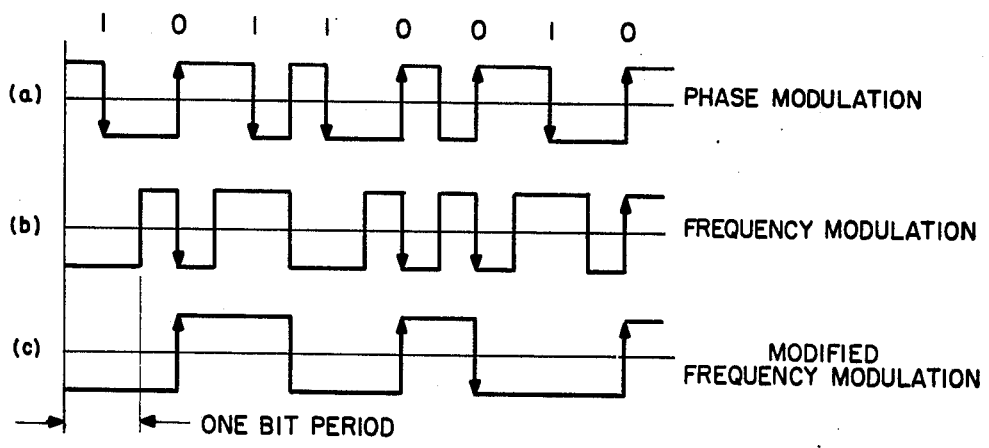
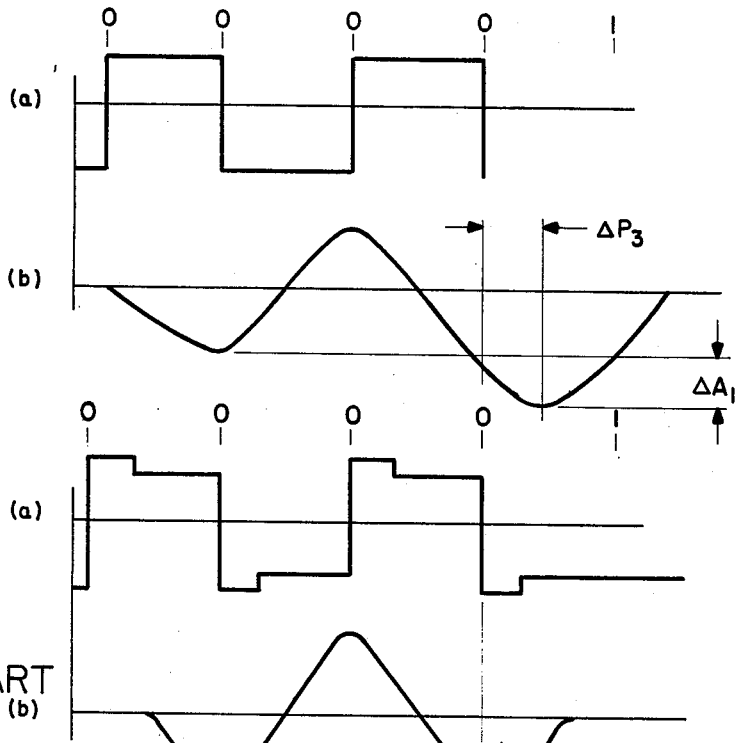
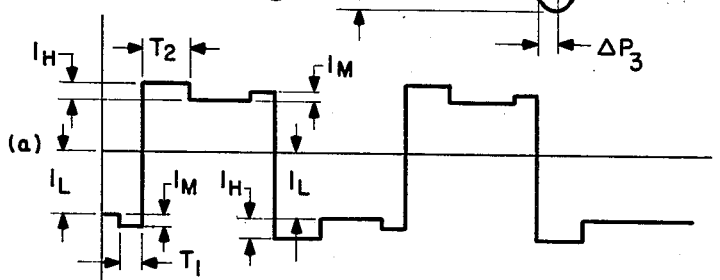

PRECEDENT AND SUBSEQUENT MINOR TRANSITIONS TO ALLEVIATE PULSE CROWDING

BACKGROUND OF THE INVENTION

In one form of magnetic storage, bits of encoded digital data are stored as magnetized portions of a magnetic medium. This medium is supported on a surface which is provided, for example, in the form of an elongated tape, a drum or a disk. In accordance with a selected coding technique, each bit of digital data may be represented by a corresponding transition from a first signal level to a second signal level, as for example in phase coding. Alternatively only digital "ONES" may be represented by a corresponding transition from a first signal level to a second signal level, as for example in NRZI coding. Recording of digital data is performed by establishing relative motion between a recording head and the medium and then exciting the recording head in accordance with the selected coding technique to produce flux transitions within the recording head. Each flux transition is produced by a transition or step in the amplitude of the current flowing in a winding mounted on the recording head. The medium adjacent the recording head stores the encoded digital data in the form of magnetized portions produced in response to the flux transitions.

Recovery of stored data is accomplished by establishing relative motion between the magnetic medium and a readout head thereby producing a corresponding readout pulse for each flux transition which occurred during recording of the digital data.

U.S. Pat. No. 3,503,059 entitled "Pulse Coding Compensation for Magnetic Recording" issued Mar. 24, 1970 in the name of L. E. Ambrico discloses an apparatus and a method to compensate and effectively eliminate peak shift and improve the amplitude response of the readout head. Peak shift is the displacement in position with respect to time of the peak amplitude of a readout pulse. Peak shift is a function of the relative spacing between flux transitions during recording of the digital data. If the spacing between transitions is relatively large then the peak amplitude has been observed to be correctly positioned. FIG. 1 illustrates that the flux transition designated A produces a pulse A' at the readout head. The pulse A' has its amplitude correctly positioned but is asymmetrical because the fall time ($T_f$) of the pulse is longer than the rise time ($T_r$). This effect has been commonly observed in recording systems and is caused by the fact that a step of write current produces a distorted step of magnetization in the magnetic medium.

FIG. 2 shows that the flux transitions B and C would produce the readout pulses B' and C' if the spacing between the flux transitions were large. Each pulse would have its respective peak amplitude correctly positioned but would be asymmetrical because the trailing edge would be longer than the leading edge. However, since the flux transitions are spaced relatively close to each other, the actual pulses produced at the readout head are B" and C" constituting the linear superposition of B' and C', this effect being well established in the magnetic recording art. It has been observed that when the two flux transitions are positioned relatively close to each other, the peak of the first pulse is reduced in amplitude ($\Delta P_B$) and shifted forward in time ($\Delta T_B$) with respect to its correct position and the peak of the second pulse is more reduced in amplitude ($\Delta P_c$) and shifted backward in time ($\Delta T_c$) with respect to its correct position. With respect to the asymmetry of readout pulses, the interference of the leading edge of C' on the trailing edge of B' is less than the effect of the trailing edge of B' on the leading edge of C' because the rise time of C' is faster than the fall time of B'. It follows that a significant improvement in the symmetry of the readout pulses will result from decreasing the fall time of B'.

As taught in the aforementioned patent of Ambrico the fall time of the readout pulse may be substantially decreased by providing a minor flux transition of lower amplitude and opposite direction following each major flux transition. While the teachings of Ambrico have enabled readout pulses to be provided which are more symmetrical and narrower than readout pulses without such compensation, it has been observed that the effect of such compensation is limited by the unimproved leading edge of the readout pulse.

With further reference to FIG. 2, utilizing the compensation taught by Ambrico will produce a readout pulse B" in which the trailing edge has returned to the base line sooner than the trailing edge of a readout pulse without such compensation. However, in most practical systems some interference will remain because there has been no improvement in the long leading edge of C'. Thus the teachings of Ambrico are limited in the results obtainable by the rise time of the readout pulse. In addition, if the compensation of Ambrico is optimized to shorten the fall time of the readout pulse to be less than its rise time, asymmetry will again be produced. The packing density is also limited by the pulse width, therefore, any increase in packing density is also limited by the rise time of the readout pulse. It follows that the prior art including the compensation taught by Ambrico is limited in the achievable packing densities by the configuration of the readout pulse. Although the readout pulses may be further narrowed by employing the compensation taught by Ambrico, some interference will still remain because of the long leading edge of the succeeding pulse.

FIG. 3 shows the effect of interference between three equally spaced relatively close flux transitions occurring in the encoded digital data. The peak of the first pulse is reduced in amplitude ($\Delta P_D$) and shifted forward in time ($\Delta T_D$) with respect to its correct position and the peak of the third pulse is also reduced in amplitude ($\Delta P_F$) and shifted backward in time ($\Delta T_F$) with respect to its correct position. However, while the peak of the second pulse is correctly positioned in time because it is subjected to equal forward and reverse shifts, it is substantially reduced in amplitude ($\Delta P_E$). As a result, the interaction of these pulses significantly effects the accuracy of the detected digital data and limits the amount of data that may be recorded on the storage medium.

SUMMARY OF THE INVENTION

The subject invention is an improved magnetic recording system for storing information in the form of encoded digital data in which major transitions from one voltage level to another representing the digital data are sensed and corresponding major transitions in current level are coupled to coils mounted on a magnetic recording head. The major current transitions produce corresponding flux transitions in the recording head which induce magnetic fields in accordance therewith on a magnetizable storage medium that is subjected to relative motion with respect to the recording head. The improvement includes a circuit for sensing the occurrence of each major voltage transition, a first current source for producing a precedent minor current transition of lower amplitude and opposite polarity thereto, a circuit for delaying each major voltage transition, a circuit for sensing the occurrence of the delayed major voltage transition, a second current source for producing a subsequent minor current transition also of lower amplitude and opposite polarity to the major voltage transition, a summing network connected to the aforementioned first and second current sources, and a third current source for producing a major current transition corresponding to each delayed major voltage transition. The summing network output is a composite current waveform comprising a minor precedent transition, a major transition and a subsequent minor transition that is coupled to the coils in the magnetic recording head through logic gates which control the direction of current flow in the coils. The resultant flux set up in the recording head magnetizes discrete portions of the storage medium which when read out produce pulses having a narrower pulse width and improved symmetry with respect to those produced by known prior art devices. As a result, the packing density in the storage medium is increased and the accuracy in reading out the recorded digital data is enhanced.

BRIEF DESCRIPTION OF THE DRAWINGS

FIG. 6 is an illustration of major transitions between voltage levels for phase modulated data, frequency modulated data and modified frequency modulated data respectively;

FIG. 7 shows a portion of a series of equally spaced major transitions between voltage levels preceding a period without transitions and the corresponding readout pulses;

FIG. 8 shows the major transitions and readout pulses of FIG. 7 as modified by a prior art technique;

FIG. 9 shows the major transitions and readout pulses of FIG. 7 as modified by the subject invention.

DESCRIPTION OF THE PREFERRED EMBODIMENT

Figure 1:
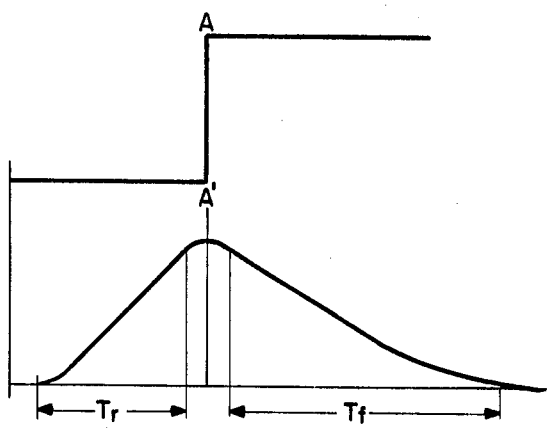
FIG. 1 is an illustration of a major transition from one voltage level to another and the corresponding readout pulse.
Figure 2:
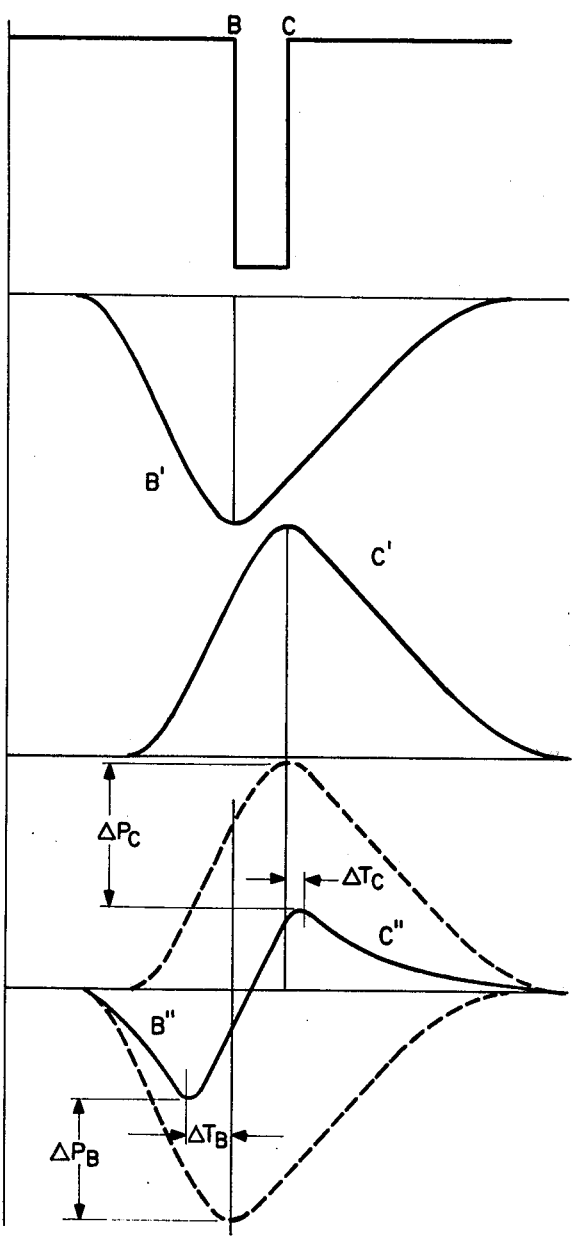
FIG. 2 is an illustration of two major transitions between voltage levels and the corresponding readout pulses.
Figure 3:
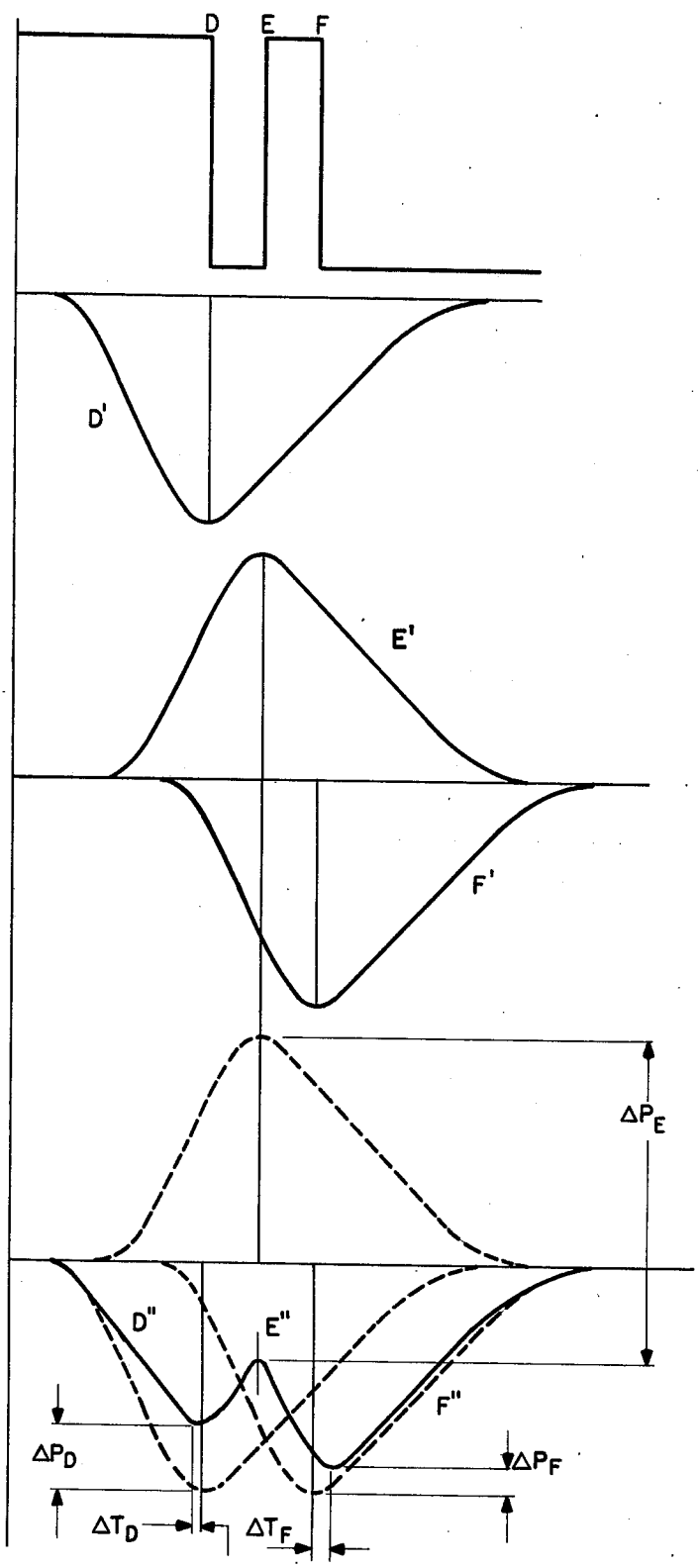
FIG. 3 is an illustration of three major transitions between voltage levels and the corresponding readout pulses.

The subject invention will be described with respect to FIG. 4 which shows a magnetic recording system 10 including a magnetizable storage medium 11 such as magnetic tape, magnetic disk or the like which is subject to relative motion by a suitable motive means (not shown) with respect to a recording or writing head 12 as indicated by the direction of the arrow. Currents $i_1$ and $i_2$ in coils 13 and 14 produce fluxes $\phi_1$ and $\phi_2$ respectively which magnetize discrete portions of the magnetizable medium 11 as its passes below gap 15 in the recording head 12. The currents $i_1$ and $i_2$ are produced and controlled by driver circuits represented generally by block 16 which has its input coupled to an encoder 17. A data source such as computer 18 provides digital data which is applied via Data and Clock lines to encoder 17 that encodes the data with an appropriate coding scheme such as phase modulation, frequency modulation or modified frequency modulation. The encoded data applied to the input of the driver circuits is in the form of major transitions or steps from one voltage level to another.

Examples of the aforementioned coding schemes are shown in FIG. 6. Phase modulated binary data is shown by the wave form (a) in FIG. 6 wherein each "ONE" is represented by a negative-going step from a higher voltage level to a lower voltage level and a "ZERO" is represented by a positive-going step from the lower voltage level to the higher voltage level. Waveform (b) shows frequency modulated binary data in which the encoded data is stepped between two voltage levels at a one bit periodic rate. In addition it also changes from one voltage level to the other voltage level at the occurrence of each "ZERO" (at a half bit rate) but the occurrence of a "ONE" does not produce any step between the voltage levels. Waveform (c) of FIG. 6 illustrates modified frequency modulated binary data in which the encoded data is stepped from one voltage level to another either positive-going or negative-going at each occurrence of a "ZERO" and at bit boundaries between adjacent "ONES".

Figure 4:
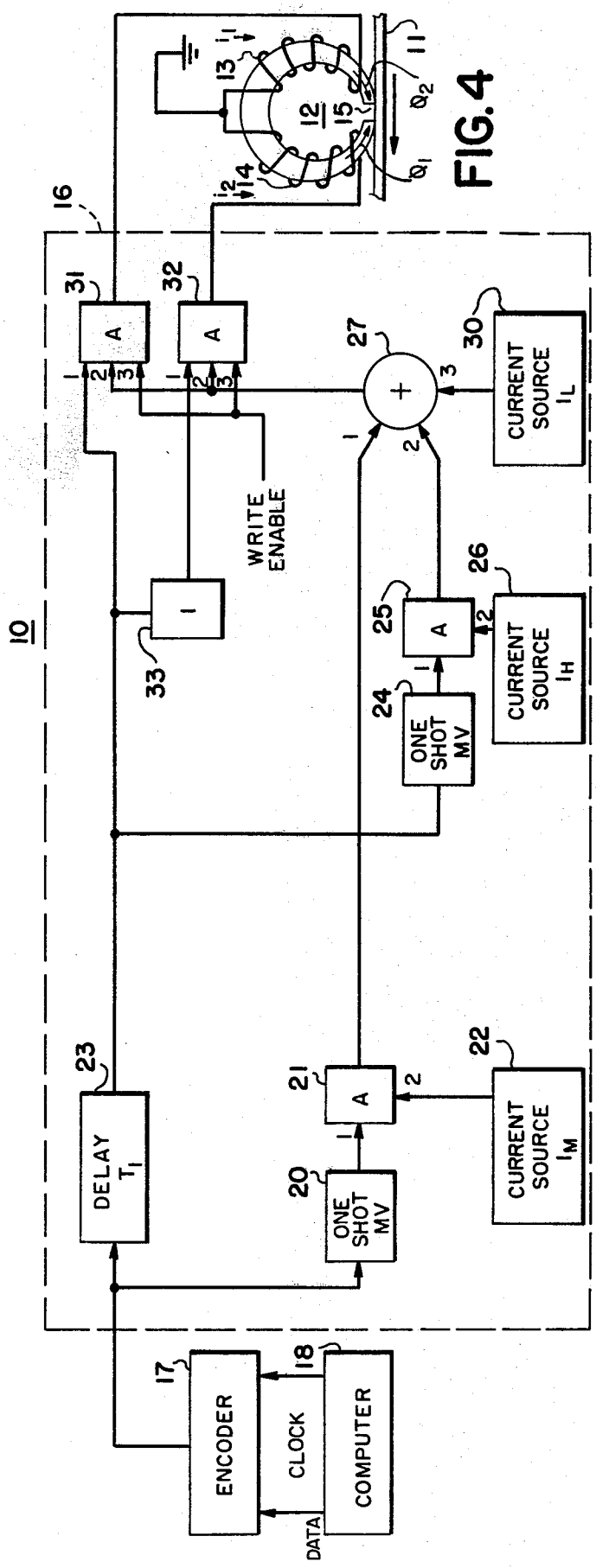
FIG. 4 is a block diagram of a magnetic recording system incorporating the improvement of the present invention.

In FIG. 4, the output of the encoder 17 is applied to the input of a device for sensing the occurrence of each major transition or step between voltage levels such as a monostable (one-shot) multivibrator 20 which has its output coupled to input terminal 1 of an AND gate 21. The other input terminal 2 of the AND gate 21 is coupled to the output terminal of a current source 22 which provides an output current IM that is coupled through AND gate 21 during the time the one-shot multivibrator 20 senses a step and is flipped into its quasi-stable state until it returns to its stable state.

A delay circuit 23 also has its input terminal connected to the output terminal of the encoder 17 and delays the occurrence of each step between voltage levels for a period of time equal to the time the output current $I_M$ is coupled through the AND gate 21. A second one-shot multivibrator 24 has its input terminal connected to the output of the delay circuit 23 for sensing the occurrence of each delayed major transition and the output of the multivibrator 24 is applied to an input terminal 1 on an AND gate 25. Connected to input terminal 2 on the gate 25 is the output terminal of a current source 26 which provides an output current $I_H$ that is coupled through AND gate 25 during the time the multivibrator 24 is in its quasi-stable state.

The output terminals of AND gate 21 and 25 are connected to two of the three input terminals 1 and 2 respectively on a summing network 27 and the third input terminal 3 is coupled to a current source 30 which continuously provides an output current $I_L$ to the summing network 27. The output terminal of the summing network 27 is connected to the input terminals 2 on AND gates 31 and 32. Terminal 1 on AND gate 31 is connected directly to the output terminal of the delay circuit 23 and terminal 1 on AND gate 32 is coupled through an inverter circuit 33 to the output terminal on the delay circuit 23. Thus, gates 31 and 32 are alternately enabled in accordance with the polarity of the desired recording. The remaining terminals 3 on AND gates 31 and 32 are coupled to a source of a WRITE ENABLE signal which controls the write cycle of the recording system. Circuits for providing the WRITE ENABLE signal are well known in the art and a detailed description thereof is not deemed to be required in order to understand the subject invention.

The output terminal of the AND gate 31 is connected to one end of the coil 13 and the output terminal of AND gate 32 is connected to one end of the coil 14. Coils 13 and 14 have the other ends thereof connected together at a common terminal. Although this common terminal is shown as a ground terminal in FIG. 4 it could be some other reference voltage level as determined by the specific circuit design.

Figure 5:
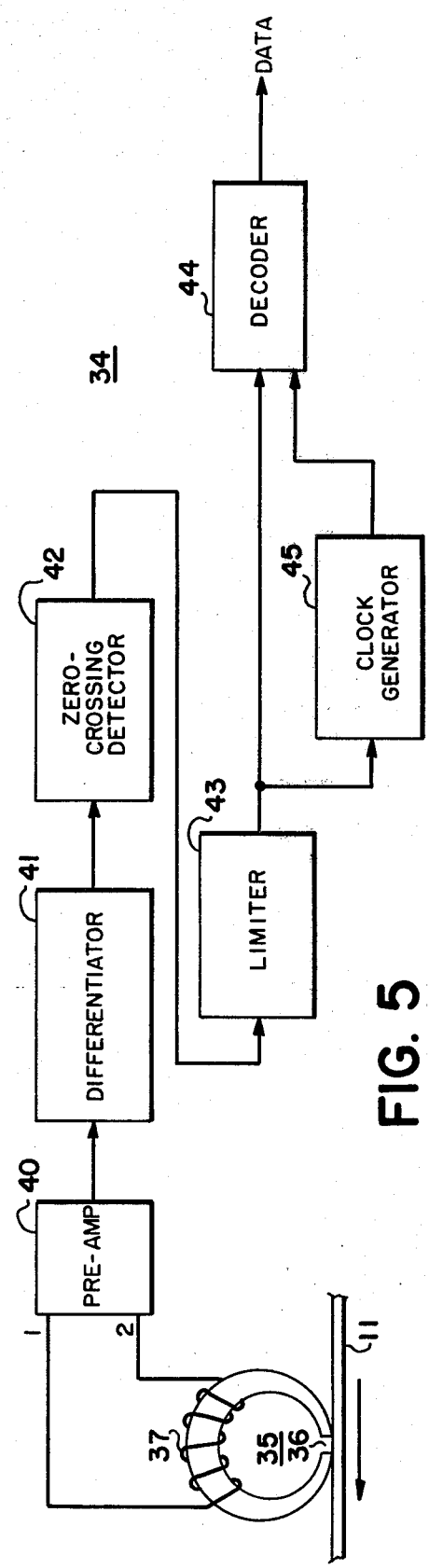
FIG. 5 is a block diagram of a system for reading out the recorded data from a magnetic medium.

A circuit 34 for reading out stored encoded data in the magnetic medium 11 is shown in FIG. 5. The readout circuit 34 includes a read head 35 having a coil 37 wound thereon which is coupled to a pre-amplifier 40. The output from the pre-amplifier 40 is coupled to a differentiating circuit 41 which produces a zero voltage crossing corresponding to each peak. The zero voltage crossings are in turn applied to a zero-crossing detector 42, such as a Schmitt Trigger circuit, which converts the zero crossings to a voltage level that is applied to a limiter circuit 43. The output of the limiter 43, is applied to a data decoder 44 and a clock generator 45 both of which are well known in the art.

FIGS. 7-9 show waveforms applied to the coils 13 and 14 that are representative of modified frequency modulated binary data for 00001 which comprises a series of equally spaced steps followed by a relatively long period without a transition. Since the configuration of the output pulse waveform corresponding to the first "ZERO" is dependent on the presence or absence of steps which precede it and these are not shown, the waveform corresponding to the first step is omitted. As shown by waveform (a) in FIG. 7, the current waveform is produced by driver circuits without either a precedent or subsequent minor step of opposite polarity to each major transition. Further while the first two output pulses are of substantially the same amplitude it will be noted that this amplitude is significantly less ($\Delta A_1$) than the amplitude of the third pulse. The reduced constant amplitude pulses occur whenever there are a series of closely spaced steps in the encoded binary data because the successive recovered pulses are of opposite polarity and the overlap between the trailing and leading edges of these pulses will produce the reduction in amplitude as shown previously. However, the amount of symmetry in these recovered pulses as exemplified by the first two pulses shown in waveform 7 (b) is less than that in the more widely spaced pulses as typified by the third pulse of waveform 7 (b) while the larger pulse exhibits a great deal of peak shifting. Large spacing between major transitions will produce recovered pulses that have a greater degree of asymmetry but increased amplitude.

With respect to peak amplitude shift it will be noted that the third pulse has a substantial backward amplitude shift. This substantial peak amplitude shift results from a combination of a lack of compensation during recording and the absence of a succeeding pulse.

FIG. 8 shows the effect of the compensation taught by Ambrico on the recovered pulses. It will be noted that the first two recovered pulses of waveform (b) have improved amplitude characteristics and the third pulse shows a dramatic improvement in the peak shift characteristic as well as an increased amplitude. Any attempt to increase the compensation of Ambrico by increasing the duration or amplitude of the minor step transition will result in the occurrence of undershoots in the recovered pulses. Ambrico in U.S. Pat. No. 3,503,059 indicates that the duration and magnitude of the minor subsequent transition is dependent upon the parameters of the recording system employed. Generally the amplitude and duration of the minor transitions taught by Ambrico are determined experimentally.

The operation of the circuit shown in FIG. 4 will be described with reference to the waveforms of FIG. 9. A data source such as the computer 18 provides digital data on the DATA input line which is clocked into the encoder 17. A suitable encoding scheme such as modified frequency modulation produces major step transitions as represented by waveform (a) in FIG. 9 in which the first four transitions are ZEROES and the absence of a fifth transition corresponds to a ONE. Digital data from the encoder 17 is applied to the input of delay network 23 which has a delay time $T_1$. The time delay $T_1$ is equal to the time required for the one-shot multivibrator 20 to switch from its stable state into its quasi-stable state and return to its stable state. The output of the encoder 17 is simultaneously applied to the input of the one-shot multivibrator 20 which produces an output pulse that is coupled to the first input terminal on AND gate 21. This pulse enables AND gate 21 for the duration of the pulse. An output current $I_M$ from the constant current source 22 is applied to the second input terminal of the AND gate 21 and is coupled through the AND gate 21 to the first input terminal on the summation circuit 27 for the duration of the output pulse from the one-shot multivibrator 20.

The summation circuit 27 also has the current $I_L$ from the current source 30 applied to its third input terminal where it is combined with the current $I_M$ applied at its first input terminal and coupled through its output terminal to the second input terminals on the AND gates 31 and 32. Thus the total current applied to the AND gates 31 and 32 will be the current represented by waveform (a) shown in FIG. 9 comprised of $I_L + I_M$.

Since this is a negative current it will be coupled through the AND gate 32 which had been previously enabled by the inverted output step coupled through the inverter 33. The total negative current $I_L + I_M$ will flow in winding 14 as $i_2$ until the delayed major step transition from the delay circuit 23 goes positive thereby disabling AND gate 32 and enabling AND gate 31. The major step transition is also coupled from the output of the delay circuit 23 to the input of the second one-shot multivibrator 24 which produces an output pulse that enables the AND gate 25. Current source 26 provides a current $I_H$ which is applied to the second input terminal of the AND gate 25 and is coupled through its output terminal to the second input terminal on the summation network 27.

The current IL from the current source 30 is continuously applied to the third terminal of the summation circuit 27 while the current $I_M$ applied to its first terminal is inhibited because the one-shot multivibrator 20 has returned to its stable state. Thus the total output current coupled from the summation circuit 27 to the second input terminal of the AND gates 31 and 32 is now $I_L+I_H$. This is shown as a positive current because it will be coupled through the AND gate 31 which is enabled by the positive major step transition coupled to its first input terminal directly from the delay circuit 23. The total positive current $I_L+I_H$ will flow in winding 13 as $i_1$ until the one-shot multivibrator 24 returns to its stable state.

Only the current $I_L$ will flow through the summation circuit 27 and the AND gate 31 to the winding 13 as $i_1$ until the one-shot multivibrator 20 senses the next major step transition. The operation of the circuit will be the same as described above with respect to the one-shot multivibrator 20, the AND gate 21, the current source 22 and the summation circuit 27. However, a difference will occur with respect to the coupling of $I_L+I_M$ to the record head 12. In this latter instance the current $I_L+I_M$ will be coupled through the AND gate 31 because it will still be enabled by the positive output coupled directly from the output terminal of the delay circuit 23 to the first input terminal of the AND gate 31. The second occurrence of $I_L+I_M$ is shown as a positive current because it will be coupled through the AND gate 31 with the winding 13 as $i_1$.

The delayed second major step transition will be sensed by the one-shot multivibrator 24 and the operation of the AND gate 25, the current source 26, and the summation circuit 27 will be as described above with respect to these circuit elements. However, a difference will occur with respect to the coupling of $I_L+I_H$ to the record head 12. In this instance the current $I_L+I_H$ will be coupled through the AND gate 32 because it will now be enabled by the negative output coupled through the inverter 33 from the output terminal of the delay circuit 23 to the first input terminal of the AND gate 32. The second occurrence of $I_L+I_H$ is shown as a negative current because it will be coupled through the AND gate 32 to the winding 14 as $i_2$. The total negative current $I_L+I_H$ will flow in the winding 14 until the one-shot multivibrator 24 returns to its stable state.

Only the current $I_L$ will flow through the summation circuit 27 and the AND gate 32 to the winding 14 as $i_2$ until the one-shot multivibrator 20 senses the next major step transition. The circuit 10 will operate as described in response to each major step transition thereby magnetizing portions of the recording medium 11 in first one direction and then the other corresponding respectively to the currents $i_1$ and $i_2$.

The description of the operation of the circuit for reading out the recorded encoded data will be presented with reference to FIGS. 5 and 9. As the magnetized portions of the recording medium 11 are moved past the air gap 36 in the read head 35 a voltage is induced across the winding 37. The voltage generated across winding 37 is applied across the input terminals 1 and 2 of pre-amplifier 40 and amplified therein to provide a plurality of positive and negative pulses in accordance with the directions of magnetization of the magnetized portions of the recording medium 11 which correspond to the major step transitions of the encoded data. Waveform (b) of FIG. 9 illustrates the improved pulses obtained from utilizing the aforesaid invention. It will be noted that the symmetry and amplitude characteristics of the recovered pulses shown in waveform (b) of FIG. 9 are improved with respect to the recovered pulses shown in waveform (b) of FIG. 8 obtained from employing a prior art apparatus.

The plurality of positive and negative pulses from the pre-amplifier 40 are coupled to the differentiator 41 which provides a peak output at the respective zero crossings of the output pulses from the pre-amplifier 40 and provides a minimum or zero output at the peaks of the output pulses from the pre-amplifier 40. The components of the output signal from the differentiator 41 are similar in polarity and duration to the encoded data output from the encoder 17. The zero voltage crossings are coupled to the zero crossing detector 42 and converted to a voltage level output signal. The limiter circuit 43 is driven by the voltage level signal and provides a relatively square output waveform conforming to the input signal coupled from the computer 18 to the encoder 17. Decoded data in the form of binary "ONES" and "ZEROES" is provided by utilizing the clock generator 45 and the decoder circuit 44 in a manner well-known in the prior art.

Using the compensation taught herein, i.e., the addition of a minor transition preceding each major transition, provides an improvement over the prior art technique of Ambrico because now the rise time of the leading edge of the recovered pulse can be reduced thereby producing a further reduction of the pulse width of the recovered pulse over that which had been obtainable heretofore. As stated above with respect to the prior art, the rise time of the recovered pulse became a limiting factor when employing the compensation of Ambrico because after decreasing the fall time as far as possible without creating undershoots, the rise time of the recovered pulse was much longer than the fall time. However, the invention disclosed herein enables both the rise time and the fall time of the recovered pulse to be decreased thereby improving the symmetry of the recovered pulse which enhances both forward and backward reading. In addition, the decreased pulse width of the recovered pulses allows the packing density to be increased.

Figure 10:
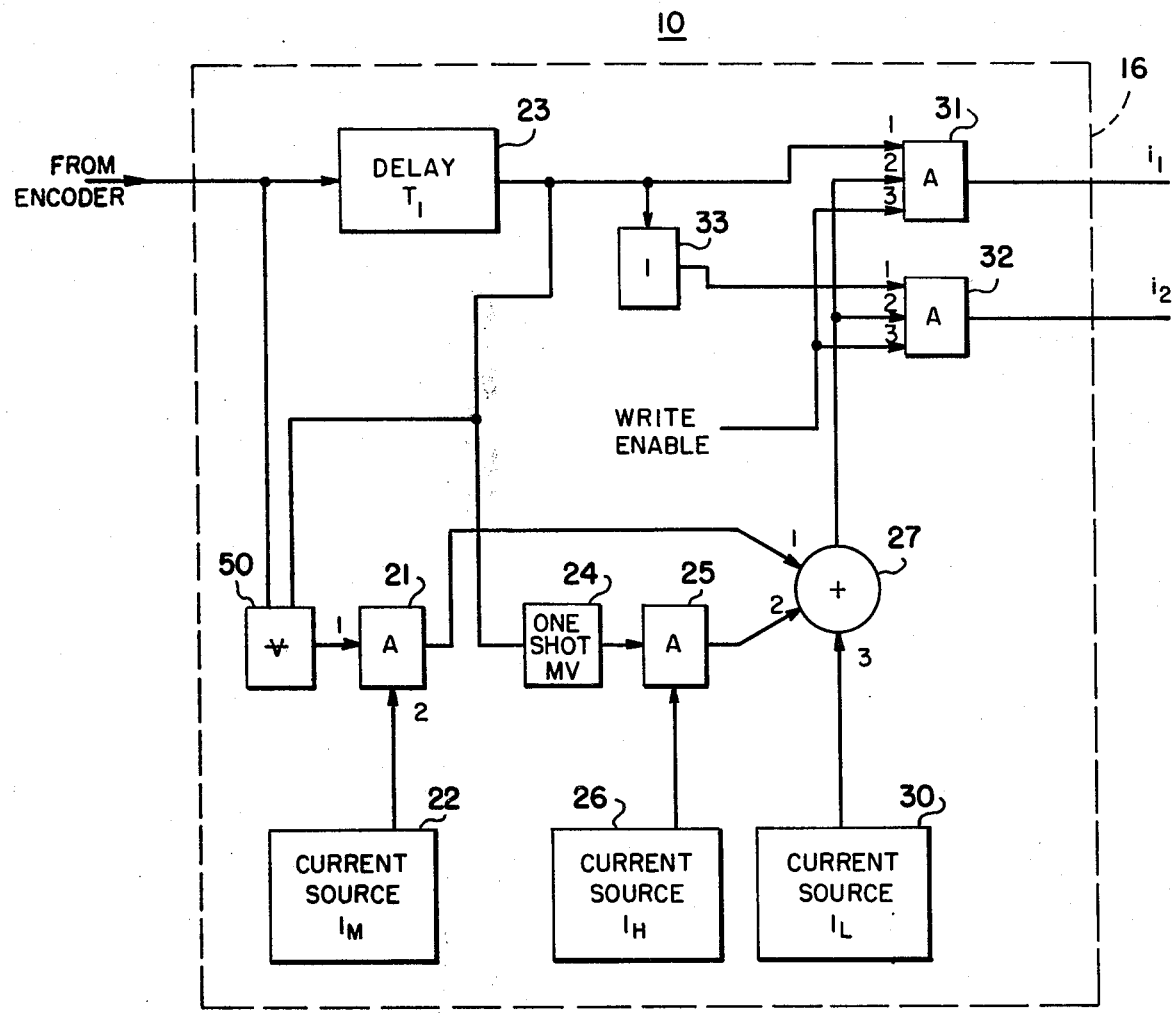
FIG. 10 is a block diagram of an alternate embodiment of the subject invention.

An alternate embodiment for practicing the invention is shown in FIG. 10 wherein those elements shown in FIG. 4 for performing the same function are identified with the corresponding reference numerals. An exclusive OR circuit 50 is provided which enables the AND gate 21 to couple the output of the current source 22 through the AND gate 21 to the first input of the summation circuit 27. The enclusive OR circuit 50 is enabled by a positive major step transition input from the encoder 17. The positive major step transition is simultaneously applied to the input of the delay circuit 30 and after the predetermined delay, $T_1$, is coupled to the exclusive OR circuit 50 thereby disabling it. Thus, following the initial application of the positive major step transition to the exclusive OR circuit 50 an output therefrom is produced which is equal in time to the duration $T_1$ of the delay circuit 30. Since the remainder of this alternate embodiment functions in the same manner as described above with respect to FIG. 4, a further detailed description of the other circuit elements is not required.

The advantage of using the exclusive OR gate 50 in place of the one-shot multivibrator 20 is that, it eliminates the necessity for providing a pulse having a pulse width equal to the delay $T_1$ of the delay circuit 30 thereby enhancing the reliability of the alternate embodiment.

While the invention has been described in its preferred embodiments, it is to be understood that the words which have been used are words of description rather than limitation and that any changes made within the purvue of the appended claims may be made without departing from the true scope and spirit of the invention in its broader aspects.

What is claimed is:

1. A method for improving the magnetic recording of digital data comprising the steps of
    encoding digital data in the form of major transitions from one voltage level to another,
    producing a composite current signal in response to each major voltage transition having a precedent minor current transition, a major transition and a subsequent minor transition in which said minor transitions are of lower amplitude and opposite direction relative to each major voltage transition, and
    alternately gating said composite current signal to a magnetic recording head for recording corresponding digital data by magnetizing portions of a magnetizable medium in accordance with said composite current signal thereby providing corresponding readout pulses having a narrower pulse width and improved symmetry which enables increasing the packing density in the storage medium and enhances the accuracy in reading out the recorded digital data.

2. In a magnetic recording apparatus as recited in claim 1 wherein said combining means includes
    a current summing network coupled to said means for producing precedent and subsequent minor current transitions, and
    a current source coupled to said current summing network which provides a current having an amplitude $I_L$ for producing a major current transition.

3. A method for improving the magnetic recording of digital data as recited in claim 1 further comprising the steps of
    sensing the occurrence of each major voltage transition,
    producing a precedent minor current transition of lower amplitude and opposite direction relative to each major voltage transition,
    delaying each major voltage transition,
    sensing the occurrence of each delayed major voltage transition,
    producing a subsequent minor current transition of lower amplitude and opposite direction relative to each delayed major voltage transition,
    producing a major current transition in response to each delayed major voltage transition, and
    combining said precedent, subsequent and major current transitions to form a composite current signal having a precedent transition, a major transition, and a subsequent transition portion.

4. In a magnetic recording apparatus as recited in claim 3 wherein said means for sensing the occurrence of a major voltage transition includes an exclusive-OR circuit.

5. A method for improving the magnetic recording of digital data as set forth in claim 3 wherein the step of producing a precedent minor current transition includes the step of
    gating a current source which provides an output current having an amplitude $I_M$ for a first predetermined period of time.

6. A method for improving the magnetic recording of digital data as set forth in claim 5 wherein the step of delaying each major voltage transition further comprises the step of
    delaying each major voltage transition for a period of time equal to that said first predetermined period of time.

7. A method for improving the magnetic recording of digital data as recited in claim 6 wherein the step of producing a subsequent minor current transition includes the step of
    gating a current source which provides an output current having an amplitude $I_H > I_M$ for a second predetermined period of time which is longer than said first predetermined period of time.

8. In a magnetic recording apparatus including a magnetizable storage medium, means for encoding digital data in the form of major transitions from one voltage level to another, and means for producing a major transition in the amplitude and direction of current coupled to a recording head in accordance with each major voltage transition, an improvement in said magnetic recording apparatus comprising
    means responsive to said encoded digital data for producing precedent and subsequent minor current transitions of lower amplitude and opposite direction relative to each major current transition, and
    means for combining said precedent and subsequent minor current transitions with said corresponding major current transitions whereby the amplitude and duration of current coupled to said recording head in accordance with each of said transitions records corresponding digital data in said storage medium that will produce a readout pulse in accordance therewith having a narrower pulse width and improved symmetry thereby enabling increased packing density in the storage medium and enhancing the accuracy in reading out the recorded digital data.

9. In a magnetic recording apparatus as recited in claim 8 wherein said means for producing precedent and subsequent minor current transitions includes means coupled to said encoding means for sensing the occurrence of a major voltage transition.

10. In a magnetic recording apparatus as recited in claim 9 wherein said means for sensing the occurrence of a major voltage transition includes a one-shot multivibrator having a quasi-stable state for a first predetermined time period.

11. In a magnetic recording apparatus as recited in claim 10 wherein said means for producing precedent and subsequent minor current transitions includes a current source coupled to said sensing means which provides a current having an amplitude $I_M$.

12. In a magnetic recording apparatus as recited in claim 10 wherein said means for producing precedent and subsequent minor current transitions includes means coupled to said encoding means for delaying the occurrence of said major voltage transitions a period of time equal to said first predetermined time period.

13. In a magnetic recording apparatus as recited in claim 12 wherein said means for producing precedent and subsequent minor current transitions further includes means coupled to said delay means for sensing the occurrence of said delayed major voltage transitions.

14. In a magnetic recording apparatus as recited in claim 13 wherein said means for sensing the occurrence of said delayed major voltage transitions includes a one-shot multivibrator having a quasi-stable state for a second period of time which is longer than said first predetermined period of time.

15. In a magnetic recording apparatus as recited in claim 13 wherein said means for producing precedent and subsequent minor current transitions further includes a current source coupled to said sensing means which provides a current having an amplitude $I_H > I_M$.

* * * * *